United States Patent
Milacic et al.

(10) Patent No.: US 8,956,773 B2
(45) Date of Patent: Feb. 17, 2015

(54) SYSTEM AND METHOD FOR DETECTING A FUEL CELL ANODE GAS COMPOSITION

(71) Applicant: Ford Motor Company, Dearborn, MI (US)

(72) Inventors: Milos Milacic, New Boston, MI (US); Falko Berg, Canton, MI (US); Jordan John Masters, Schafhof (DE); Suriyaprakash Ayyangar Janarthanam, Westland, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 13/627,197

(22) Filed: Sep. 26, 2012

(65) Prior Publication Data

US 2013/0022886 A1    Jan. 24, 2013

Related U.S. Application Data

(63) Continuation of application No. 12/354,181, filed on Jan. 15, 2009, now Pat. No. 8,338,044.

(51) Int. Cl.
*H01M 8/00* (2006.01)
*H01M 8/06* (2006.01)
*H01M 8/18* (2006.01)
*H01M 8/04* (2006.01)

(52) U.S. Cl.
CPC ...... *H01M 8/04097* (2013.01); *H01M 8/04619* (2013.01); *H01M 8/04626* (2013.01); *Y02E 60/50* (2013.01); *H01M 8/04402* (2013.01); *H01M 8/04425* (2013.01); *H01M 8/04164* (2013.01); *H01M 8/04231* (2013.01); *H01M 8/04462* (2013.01); *H01M 8/04514* (2013.01); *H01M 8/04358* (2013.01); *H01M 8/04589* (2013.01); *H01M 8/04343* (2013.01)
USPC .......................... 429/415; 429/408; 429/400

(58) Field of Classification Search
USPC ........................................................ 429/535
See application file for complete search history.

(56) References Cited

U.S. PATENT DOCUMENTS

| | | | |
|---|---|---|---|
| 6,124,054 A | 9/2000 | Gorman et al. | |
| 7,147,945 B2 | 12/2006 | Balliet et al. | |
| 2004/0219406 A1 | 11/2004 | Sugawara et al. | |
| 2005/0181249 A1 | 8/2005 | Logan | |
| 2006/0003204 A1* | 1/2006 | Callahan et al. | 429/22 |
| 2006/0051632 A1 | 3/2006 | Kamihara | |
| 2006/0068243 A1 | 3/2006 | Lienkamp | |
| 2006/0121326 A1* | 6/2006 | Hiramatsu et al. | 429/25 |
| 2006/0134478 A1 | 6/2006 | Fuse | |
| 2007/0231636 A1 | 10/2007 | Alp et al. | |
| 2007/0231644 A1 | 10/2007 | Kanno | |

* cited by examiner

*Primary Examiner* — Barbara Gilliam
*Assistant Examiner* — Steven Scully
(74) *Attorney, Agent, or Firm* — Brooks Kushman P.C.; Damian Porcari

(57) ABSTRACT

In at least one embodiment, a purge system for a fuel cell stack is provided. The system comprises a blower, a differential pressure sensor and a purge valve. The blower delivers a recirculated gas back to the stack at varying electrical power levels and blower speeds. The differential pressure sensor senses pressure of the recirculated gas across the blower. The purge valve purges the recirculated gas based on at least one of a blower power level, a blower speed, and the pressure of the recirculated gas.

20 Claims, 6 Drawing Sheets

SYSTEM AND METHOD FOR DETECTING A FUEL CELL ANODE GAS COMPOSITION

CROSS-REFERENCE TO RELATED APPLICATIONS

This application is a continuation of U.S. application Ser. No. 12/354,181 filed Jan. 15, 2009, now U.S. Pat. No. 8,338,044 B2, the disclosure of which is incorporated in its entirety by reference herein.

TECHNICAL FIELD

The embodiments described herein generally relate to a system and method for detecting an anode gas composition during fuel cell operation.

BACKGROUND

It is known that a number of fuel cells are joined together to form a fuel cell stack. Such a stack generally provides electrical current in response to electrochemically converting hydrogen and oxygen into water. The electrical current generated in such a process is used to drive various devices in a vehicle or other such apparatus. A supply generally provides hydrogen to an anode side of the fuel cell stack. The fuel cell stack may use less hydrogen than provided by the supply to generate electrical power. A mixing chamber (or ejector) receives unused hydrogen discharged from the fuel cell stack and combines the unused hydrogen with the hydrogen generated from the supply to sustain a flow of hydrogen to the fuel cell stack. In some cases, the unused hydrogen may include impurities such as water that is in the form of de-ionized water (DI) vapor and/or nitrogen which may need to be removed from the unused hydrogen prior to the delivery of the unused hydrogen to the ejector. The impurities generally result from the use of air, rather than pure oxygen. The nitrogen, from air, may cross over into the unused hydrogen by diffusion through a membrane in the fuel cell from a cathode side. A majority of the water (both in liquid and in vapor form) is discharged from the fuel cell stack to an exhaust of the cathode side on the fuel cell stack. However, a fraction of the water generated may permeate into the unused hydrogen. The mixing chamber presents the supply hydrogen with the unused hydrogen to the fuel cell stack. The recirculation of the unused hydrogen to the fuel cell stack may improve fuel efficiency.

The amount of flow of hydrogen that is passed through the fuel cell stack depends on the amount of current generated by the fuel cell stack. In a high current generating mode, the flow of the unused hydrogen discharged from the fuel cell stack is generally high since the fuel cell stack has to consume more hydrogen at a relatively faster rate in order to generate a greater amount of power. In a low current generating mode, the flow of the unused hydrogen discharged from the fuel cell stack is low since the fuel cell stack consumes a small amount of hydrogen while producing smaller amounts of power.

In the low current generating mode, the low flow rate of unused hydrogen may make it difficult to remove impurities and cause fuel starvation since the water generated in response to electro-chemically combining hydrogen and oxygen diffuses to an anode side and without sufficient gas flow to push the water droplets, catalyst sites on the membrane electrode assembly (MEA) are blocked. The low flow rate of the unused hydrogen and the presence of impurities in the unused hydrogen may affect the production of electrical power and adversely affect the life span of the fuel cell stack.

SUMMARY

In at least one embodiment, a purge system for a fuel cell stack is provided. The system comprises a blower, a differential pressure sensor and a purge valve. The blower delivers a recirculated gas back to the stack at varying electrical power levels and blower speeds. The differential pressure sensor senses pressure of the recirculated gas across the blower. The purge valve purges the recirculated gas based on at least one of a blower power level, a blower speed, and the pressure of the recirculated gas.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
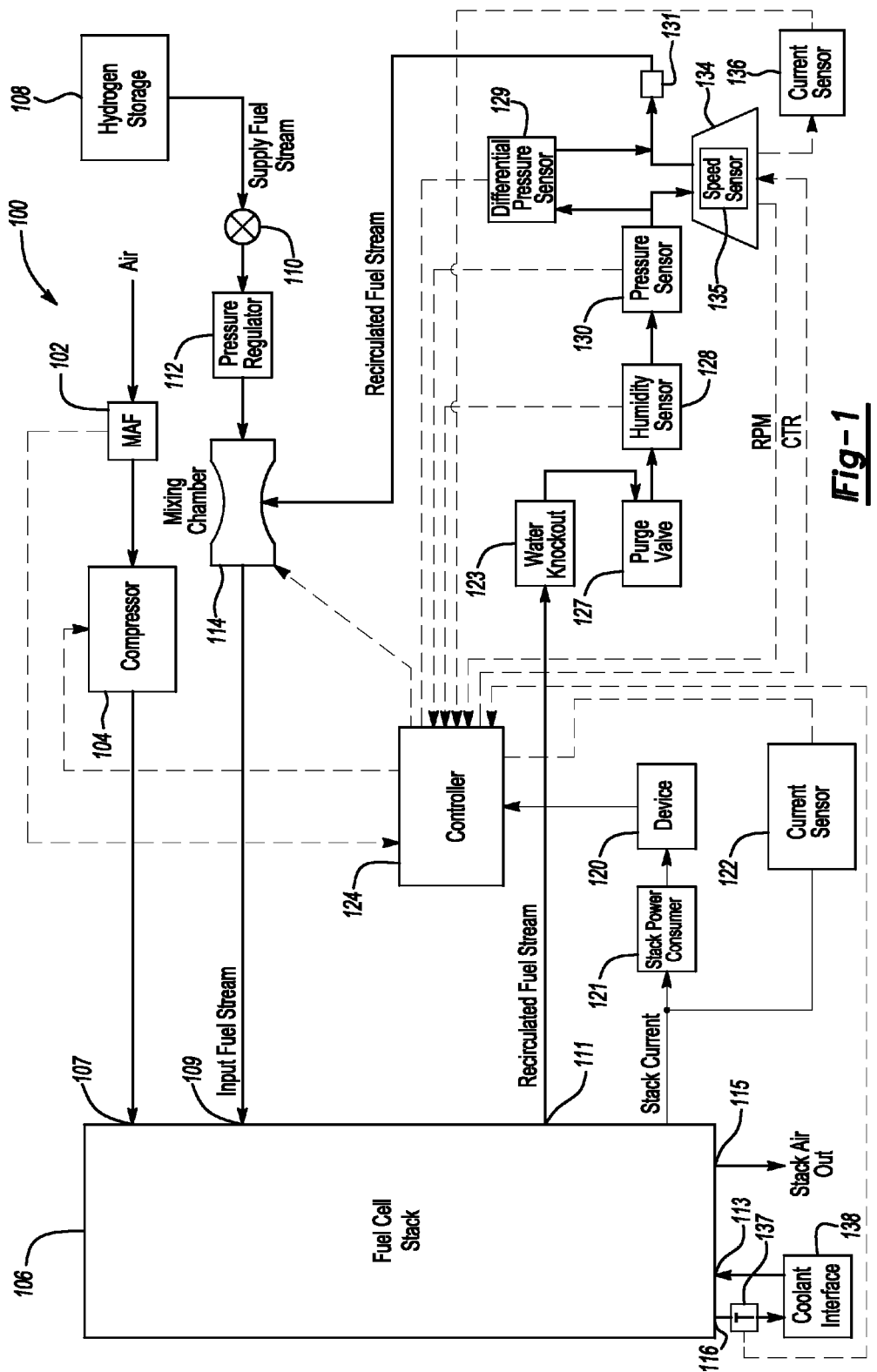
FIG. 1 depicts a fuel cell stack recirculating and purging system in accordance to one embodiment of the present invention.

FIG. 1 depicts a fuel cell stack recirculating and purging system 100 in accordance to one embodiment of the present invention. The system 100 may be implemented in a fuel cell based electric vehicle or fuel cell based hybrid vehicle or any other such apparatus that uses electrical current to drive various devices.

A first fluid stream (or cathode stream) which comprises air is fed to a mass air flow (MAF) sensor 102. The air passing through the MAF sensor 102 is atmospheric air. The MAF sensor 102 measures the amount of flow of air in the fluid stream. An air compressor 104 pressurizes the air stream and delivers the air stream to a fuel cell stack 106. The fuel cell stack 106 includes a first inlet 107 for receiving the air stream. A humidifier (not shown) may be added to the system 100 to add water vapor into the air stream. A humidity sensor (not shown) may be needed to measure the wet air. The water may be needed to ensure that membranes (not shown) in the fuel cell stack 106 remain humidified to provide for optimal operation of the fuel cell stack 106.

A hydrogen tank (or supply) 108 presents a supply fuel stream (or an anode stream) in the form of hydrogen. The supply fuel stream comprises compressed hydrogen. While compressed hydrogen may be used in the system 100, any hydrogen fuel source may be implemented in the system 100. For example, liquid hydrogen, hydrogen stored in various chemicals such as sodium borohydride or alanates, or hydrogen stored in metal hydrids may be used instead of compressed gas.

A tank valve 110 controls the flow of the supply hydrogen. A pressure regulator 112 regulates the flow of the supply hydrogen. A mixing chamber 114 (or ejector either a variable or multistage ejector or other suitable ejector) is configured to combine the supply hydrogen (e.g., hydrogen received from the tank 108) with unused hydrogen (e.g., recirculated from the fuel cell stack 106) to generate an input fuel stream. The pressure regulator 112 is generally adapted to provide the supply hydrogen to the mixing chamber 114 at a constant pressure. A humidifier (not shown) may be provided to add water vapor to the input fuel stream. Water vapor in the input fuel stream may be needed to ensure that the membranes in the fuel cell stack 106 remain humidified to provide for optimal operation of the fuel cell stack 106.

The fuel cell stack 106 includes a second inlet 109 that is adapted to receive the input fuel stream from the mixing chamber 114. The fuel cell stack 106 generates stack current in response to electrochemically converting the hydrogen from the input fuel stream and oxygen from air in the first fluid stream. A stack power consumer(s) 121 is operably coupled to the fuel cell stack 106 for consuming and/or storing electrical power generated by the fuel cell stack 106. The stack power consumer 121 may be a battery or other electrical load.

If the system 100 is used in connection with a vehicle, the stack power consumer(s) 121 may include a motor or a plurality of vehicle electrical components that each consume power to function for a particular purpose. For example, such stack power consumers 121 may be associated with and not limited to a vehicle powertrain, occupant heating and cooling, interior/exterior lighting, entertainment devices, and power locks and windows. The particular types of consumers 121 implemented in the vehicle may vary based on vehicle content, the type of motor used, and the particular type of fuel cell stack implemented. A current sensor 122 measures the stack current generated by fuel cell stack 106. A controller 124 receives measured current readings from the current sensor 122.

In general, excess amounts of air and hydrogen are delivered to the fuel cell stack 106 to increase operational robustness of the fuel cell stack 106. The fuel cell stack 106 may discharge unused hydrogen in a recirculated fuel stream. An outlet 111 of the fuel cell stack 106 is adapted to discharge the recirculated fuel stream. The recirculated fuel stream may include various impurities such as nitrogen and water both in liquid and vapor form in addition to hydrogen.

A water knockout system 123 receives the recirculated fuel stream from the fuel cell stack 106 and removes water in liquid form from the recirculated fuel stream. The water knockout system 123 is operatively coupled to the controller 124. The water knockout system 123 includes a drain valve (not shown) with an optional level switch indicator (not shown). The controller 124 controls the drain valve such that the drain valve opens to allow the water to flow therethrough out of the recirculated fuel stream.

A purge valve 127 is fluidly coupled to the water knockout system 123 and electrically coupled to the controller 124. In the event more nitrogen is in the recirculated fuel stream than hydrogen, the controller 124 controls the purge valve 127 to open to discharge the anode mixture from the recirculated fuel stream. The manner in which the controller 124 determines the amount of nitrogen or other impurities in the recirculated fuel stream will be discussed in more detail in connection with FIGS. 2-4. In response to the purge valve 127 opening to discharge anode gas mixture, the controller 124 controls the tank valve 110 to increase the flow of hydrogen into the system 100 to increase the amount of hydrogen present in the system 100. The controller 124 controls the purge valve 127 to close in response to determining that the hydrogen in the recirculated fuel stream is at an adequate level. It is generally contemplated that the drain and purge functionality may also be combined into a single integrated apparatus. Further, it is generally contemplated that the purge valve 127 may purge for other reasons than those disclosed above.

A humidity sensor 128 is configured to receive the recirculated fuel stream from the purge valve 127 and is electrically coupled to the controller 124. The humidity sensor 128 measures the amount of water (e.g., in vapor form) in the recirculated fuel stream and transmits such measurements to the controller 124. A pressure sensor 130 is configured to receive the recirculated fuel stream and is electrically coupled to the controller 124. A blower 134 is configured to receive the recirculated fuel stream and increase the pressure for recirculating the recirculated fuel stream in response to the controller 124. The pressure sensor 130 measures the pressure of the recirculated fuel stream at an inlet of the blower 134. The pressure sensor 130 transmits the inlet pressure of the blower 134 to the controller 124.

The blower 134 may include a rotational speed sensor 135, such as Hall sensor type for measuring the revolutions per minute (RPM) of the blower 134. The rotational speed sensor 135 transmits the RPM of the blower 134 to the controller 124. A current sensor 136 is operably coupled to the blower 135 and the controller 124. The current sensor 136 measures the amount of current consumed by the blower 134 while driving the recirculated fuel stream. The relevance of the RPM data related to the blower 134, pressure data at the inlet of the blower 134, current (or power) consumption of the blower 134, and humidity of the recirculated fuel stream will be discussed in more detail in connection with FIGS. 2 and 5. In one implementation, a differential pressure sensor 129 may be fluidly coupled to the blower 134 to measure the differential pressure of gas (e.g., $\Delta p_{Gas}$) in the recirculated fuel stream between an inlet and outlet of the blower 134. The $\Delta p_{Gas}$ may be used by the controller 124 to determine the molar mass of the gas in the recirculated fuel stream.

In general, the controller 124 may activate the blower 134 regardless of the amount of power that is being generated by the fuel cell stack 106. The pressure sensor 130 and the differential pressure sensor 129 may be two separate sensors or implemented as a single sensor which can provide differential pressure as well as absolute pressure signals to the controller 124. In the event the controller 124 activates the blower 134 based on the amount of current generated by the fuel cell stack 106, the controller 124 takes into account the following between the low current generating mode and the high current generating mode. While the fuel cell stack 106 is in a low current generating mode, the flow and pressure of the recirculated fuel stream may be low. In general, the fuel cell stack 106 may be in the low current generating mode when the vehicle or apparatus is in an idle state. During fuel cell operation, water buildup may occur within flow channels (or fields) of the fuel cell plate in the fuel cell stack 106 and prevent hydrogen from contacting the membrane. In addition, in the event there is more nitrogen in the recirculated fuel stream than hydrogen (generally such a condition may not exist while the fuel cell stack 106 is operating under normal operation, but may, nonetheless exist), such a condition may provide a gas mixture that is heavier when compared to the recirculated fuel stream that includes a sufficient amount of hydrogen.

In the low current generating mode, the controller 124 controls the blower 134 to increase the flow rate by increasing pressure of the recirculated fuel stream. The increased flow rate created by the blower 134 drives water from the flow fields of the fuel cell plate and prevents localized fuel starvation and cell corrosion.

In the event the fuel cell stack 106 is in a high current generating mode (e.g., vehicle operating at high speed and generating large amounts of current), the controller 124 may reduce the speed of the blowers or completely disable the blower 134. In the high current generating mode, the flow rate and pressure of the recirculated fuel stream may be adequate to carry water away from the flow fields of the fuel cell plate. The use of the blower 134 may or may not be needed while the system 100 is in operation mode generating current. A check valve 131 may be optionally coupled in series with the blower 134. The check valve 131 prevents a reverse flow of the recirculated fuel stream back to the blower 134 while the system 100 is in the high current generating mode.

The mixing chamber 114 is adapted to increase or decrease the flow rate of the input fuel stream into the stack 106 and pressure of hydrogen (e.g., the unused hydrogen discharged from the fuel cell stack 106 and the supply hydrogen delivered from the tank 108) presented to the fuel cell stack 106 in response to the controller 124. The mixing chamber 114 is adapted to receive the supply hydrogen at a constant pressure rate (e.g., d/dt). The mixing chamber 114 is adapted to receive the recirculated fuel stream at varying flow rates.

The mixing chamber 114 may be implemented with a solenoid (not shown) and/or a needle valve (not shown). The solenoid may move the needle valve in the mixing chamber 114 in response to the controller 124 thereby allowing for an increase or decrease of the flow and pressure of input fuel stream presented to the fuel cell stack 106. The movement of the needle is variable in nature to allow for different flow rates of the unused hydrogen to be combined with the supply fuel stream from the tank 108. Such a variable characteristic allows the mixing chamber 114 to adjust the overall flow and pressure of the input fuel stream presented to the fuel cell stack 106. While the system 100 is in the high current generating mode, the mixing chamber 114 increases the pressure of the recirculated stream to a level above the incoming stream, which may be adequate to remove water from the membranes of the fuel cells in the fuel cell stack 106.

The fuel cell stack 106 includes an outlet 115 that is configured to discharge excess air. The fuel cell stack 106 includes outlet 116 that is adapted to present a suitable coolant (such as de-ionized water ethylene glycol DIWEG or other suitable coolant) in response to the heat generated due to the chemical reaction of hydrogen and oxygen (e.g., from the air stream). A cooling interface 138 may receive the coolant from the fuel cell stack 106. The cooling interface 138 may also provide stack coolant to an inlet 113 of the fuel cell stack 106. A temperature sensor 137 is positioned between the outlet 116 and the coolant interface 138 for measuring the temperature of the coolant. The temperature sensor 137 is electrically coupled to the controller 124 and transmits temperature readings to the controller 124.

In a first implementation, the controller 124 is configured to determine the molar mass of the gas within the recirculated fuel stream at least one of pressure readings provided by the differential pressure sensor 129, blower speed readings provided by the speed sensor 135, and current levels used by the blower 134. In a second implementation, the controller 124 is configured to determine a molar mass of the gas within recirculated fuel stream based on a comparison between the measured power of the blower 134 and a calculated total power. A number of other such variables may be used to determine the molar mass of the recirculated fuel stream for the second implementation as will be discussed in more detail in connection with FIGS. 3-5. Once the molar mass is established, a determination can be made by the controller 124 to determine the hydrogen concentration (or the amount of hydrogen present) in the recirculated fuel stream.

Figure 2:
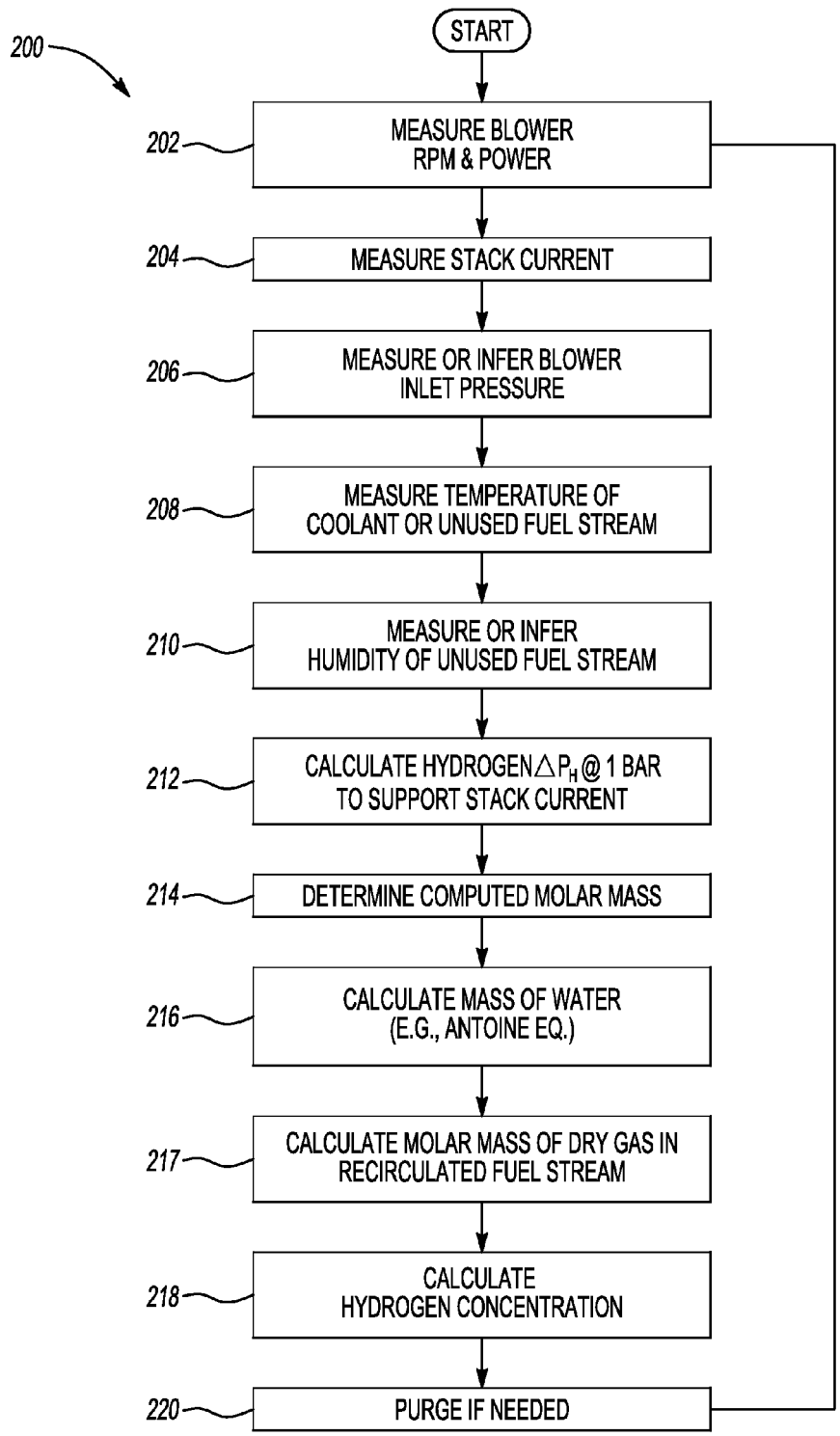
FIG. 2 depicts a flow diagram for detecting a gas composition of a recirculated fuel stream based on the system of FIG. 1.

FIG. 2 depicts a flow diagram 200 for detecting a gas composition of the recirculated fuel stream of the system 100 for the second implementation.

In block 202, the current sensor 136 measures the amount of current that is being consumed by the blower 134 to drive the blower. The current sensor 136 transmits the measured current to the controller 124 to determine blower power (or measured power). As noted above, the controller 124 may activate the blower 134 and determine the order regardless of the amount of power that is being generated by the fuel cell stack 100. In the event the controller 124 determines the molar mass based on a current generating mode of the fuel cell stack 106, the following conditions may apply. The speed sensor 135 measures the blower RPM and transmits such data to the controller 124. In one example, the speed sensor may not implemented in the event the blower 134 is configured to provide a torque signal for transmission to the controller 124 so that the controller 124 determines the RPM of the blower in response to the torque values indicated on the torque signal. Either manner may be suitable for implementation in the system 100.

The system 100 may not determine the amount of hydrogen in the recirculated fuel stream in the event the blower RPM is below a predetermined RPM value. In one example, the predetermined RPM value may correspond to one third of total RPM capability of the blower 134. In such a case, in the event the blower RPM corresponds to a value that is less than or equal to approximately one third of the total RPM capability of the blower 134, such a condition may be indicative that the system 100 is in the very low current generating mode. In that case, there are vehicle strategies that can be used to ensure uninterrupted operation of the fuel cell such as start-stop, stop-idle or similar operating modes.

In block 204, the current sensor 122 measures the stack current that is generated by the fuel cell stack 106 and transmits such data to the controller 124.

In block 206, the pressure sensor 130 measures the pressure of the recirculated fuel stream at the inlet of the blower 134. The pressure sensor 130 transmits such data to the controller 124. It also contemplated that the controller 124 may infer the pressure at the inlet of the blower 134 instead of implementing the pressure sensor 130 in the system 100. For example, a pressure sensor (not shown) may be positioned about the inlet 109 of the fuel cell stack 106 and may be coupled to the controller 124. An additional pressure sensor (not shown) may be positioned within the fuel cell stack 106 and coupled to the controller 124. The controller 124 may determine the pressure differential between the pressure sensor positioned about the inlet 109 and the pressure sensor positioned within the fuel cell stack 106 and use such a pressure differential as the assumed pressure at the inlet of the blower 134. Either method may be suitable to determine the pressure at the inlet of the blower 134.

In block 208, the temperature sensor 137 measures the temperature of the coolant and transmits such data to the controller 124. In one example, the temperature sensor 116 may be positioned across the recirculated fuel stream so that the temperature sensor 116 measures the temperature of the recirculated fuel stream and transmits such data to the controller 124. Either implementation (e.g., temperature sensor measuring temperature of coolant or temperature sensor measuring temperature of recirculated fuel stream) may be suitable.

In block 210, the humidity sensor 128 measures the amount of water present in the recirculated fuel stream and transmits humidity readings to the controller 124. In one example, the system 100 may be implemented without the humidity sensor 128 and the controller 124 may instead infer that the humidity of the recirculated fuel stream is at an assumed humidity level. Such inferred humidity levels may be based on current operating conditions of the stack 106 (e.g., 60-100%).

Figure 3:
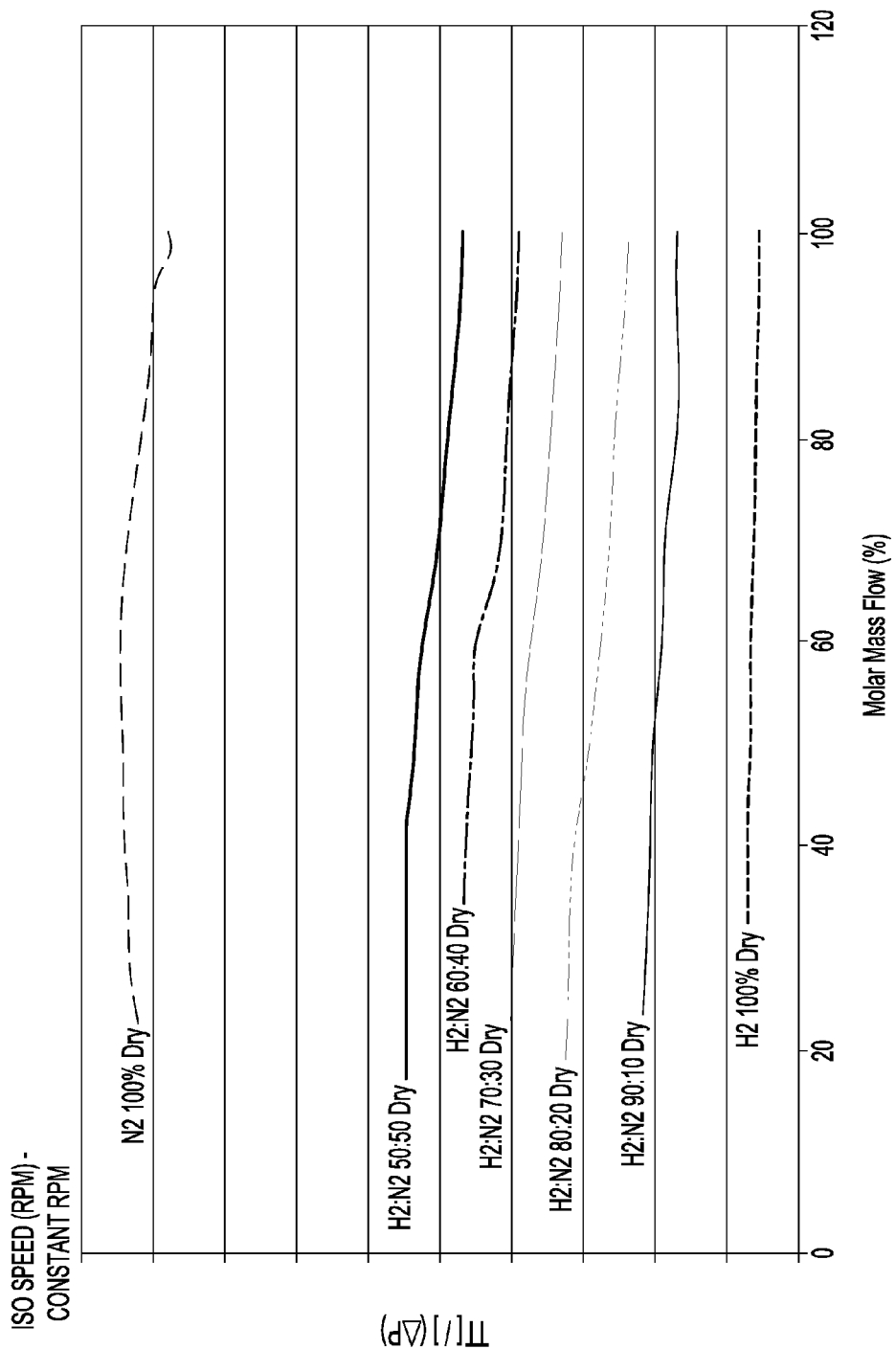
FIG. 3 depicts a plot indicating pressure ratios (or differential pressure) and molar flow for a particular blower revolution per minute (RPM)

In block 212, the controller 124 calculates the differential pressure ($\Delta p_H$) of hydrogen across the blower 134@1 Bar to support the stack current. A pressure ratio (e.g., $\pi$) of hydrogen may correspond to $1.01\pi$ as illustrated in FIG. 3. The pressure ratio of hydrogen may be determined with $\Delta p_H$. FIG. 3 generally illustrates ISO speed curves which correspond to pressure ratio values for the gases present in the recirculated fuel stream based on a particular blower RPM value of the blower 134. Such information may be stored in a lookup table of the controller 124. In general, the curves as depicted in FIG. 3 may vary based on the particular type of blower implemented. Further, such pressure ratios and molar mass flow values may vary based on the particular blower RPM value. Block 212 will be discussed in more detail in connection with FIG. 5.

In block 214, the controller 124 calculates the computed molar mass of the recirculated fuel stream. The computed molar mass is generally the sum of the molar mass fraction of nitrogen (i.e., the molar mass of nitrogen multiplied by a fraction of nitrogen), the molar mass fraction of hydrogen (i.e., the molar mass of hydrogen multiplied by a fraction of hydrogen), and the molar mass fraction of gaseous water (i.e., the molar mass of water multiplied by a fraction of water) in the recirculated fuel stream. Block 214 will be discussed in more detail in connection with FIG. 5.

In block 216, the controller 124 receives the temperature of the coolant (or the recirculated fuel stream), to calculate the vapor pressure of the water in the recirculated fuel stream. The vapor pressure of the water may be obtained with the Antoine equation as shown below:

$$\log p = A - \frac{B}{T+C} \quad \text{(Eq. 1)}$$

where A, B, and C are "Antoine coefficients" that are related to water and T is the temperature of coolant (or of the recirculated fuel stream). The controller 124 computes the partial pressure of the water based upon the relative humidity and pressure at the inlet of the blower 134 thereby establishing the water content (or the mass of water) in the recirculated fuel stream.

In block 217, the controller 124 subtracts the mass of water from the computed molar mass as determined in block 214 to compute the final molar mass (or molar mass of dry gas). The dry gas molar mass may comprise a dry mixture of hydrogen and/or nitrogen.

In block 218, the controller 124 determines the hydrogen concentration in the recirculated fuel stream with the molar mass of the dry gas. The molar mass of dry gas is a value between 2 g/mol and 28 g/mol (e.g., pure hydrogen and pure nitrogen, respectively).

In block 220, the controller 124 may purge the recirculated fuel stream or add hydrogen from the tank 108 by regulating the pressure regulator 112 upward.

Figure 4:
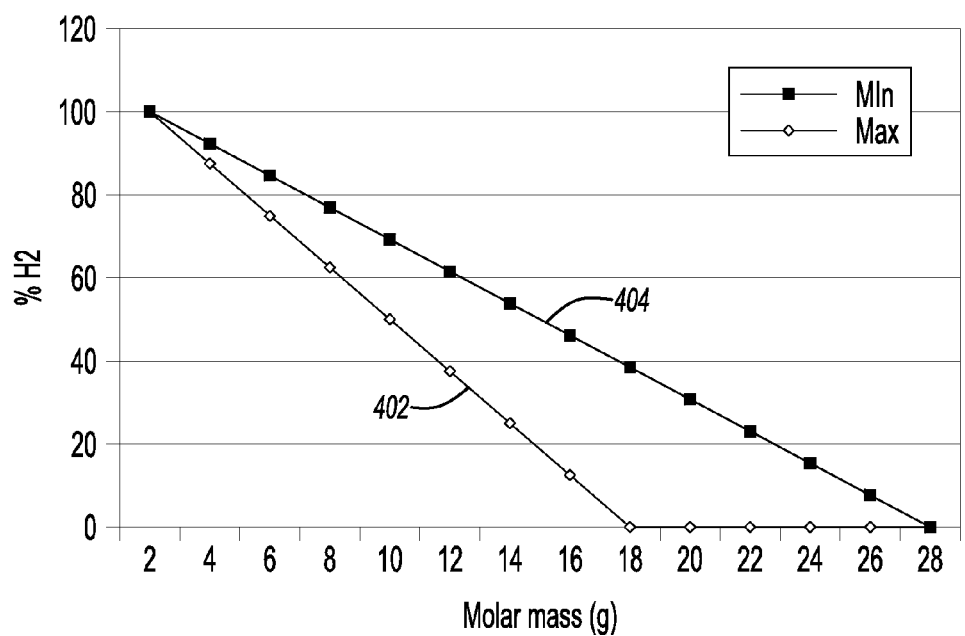
FIG. 4 depicts a plot indicating hydrogen concentration as a function of a mixture of molar mass.

FIG. 4 is a plot 400 illustrating various hydrogen concentration levels for a particular molar mass. Greater hydrogen concentration levels are generally indicative of smaller amounts of impurities that may be present in the recirculated fuel stream. Conversely, lesser amounts of hydrogen concentration levels are generally indicative of greater amounts of impurities that may be present in the recirculated fuel stream. The plot 400 includes a first line 402 and a second line 404 which differ from one another based on the amount of humidity detected (or inferred) in the recirculated fuel stream. The first line 402 corresponds to a hydrogen concentration and molar mass for a hydrogen/water mixture. The second line 404 corresponds to hydrogen concentration and molar mass for a dry gas which comprises hydrogen and nitrogen.

The controller 124 may control the purge valve 127 to open to discharge the nitrogen (or other such impurities) present in the recirculated fuel stream in response to determining that the dry gas molar mass has exceeded a predetermined molar mass set point (e.g., the predetermined molar mass set point may correspond to 10 g/mol (see line 402) or the predetermined molar mass set point may correspond to 14 g/mol (see line 404)). The purge valve 127 may remain in a closed state and allow the transmission of the recirculated fuel stream to the blower 134 and to the mixing chamber 114 in the event the dry gas molar mass is detected to be below the predetermined molar mass set point.

Figure 5:
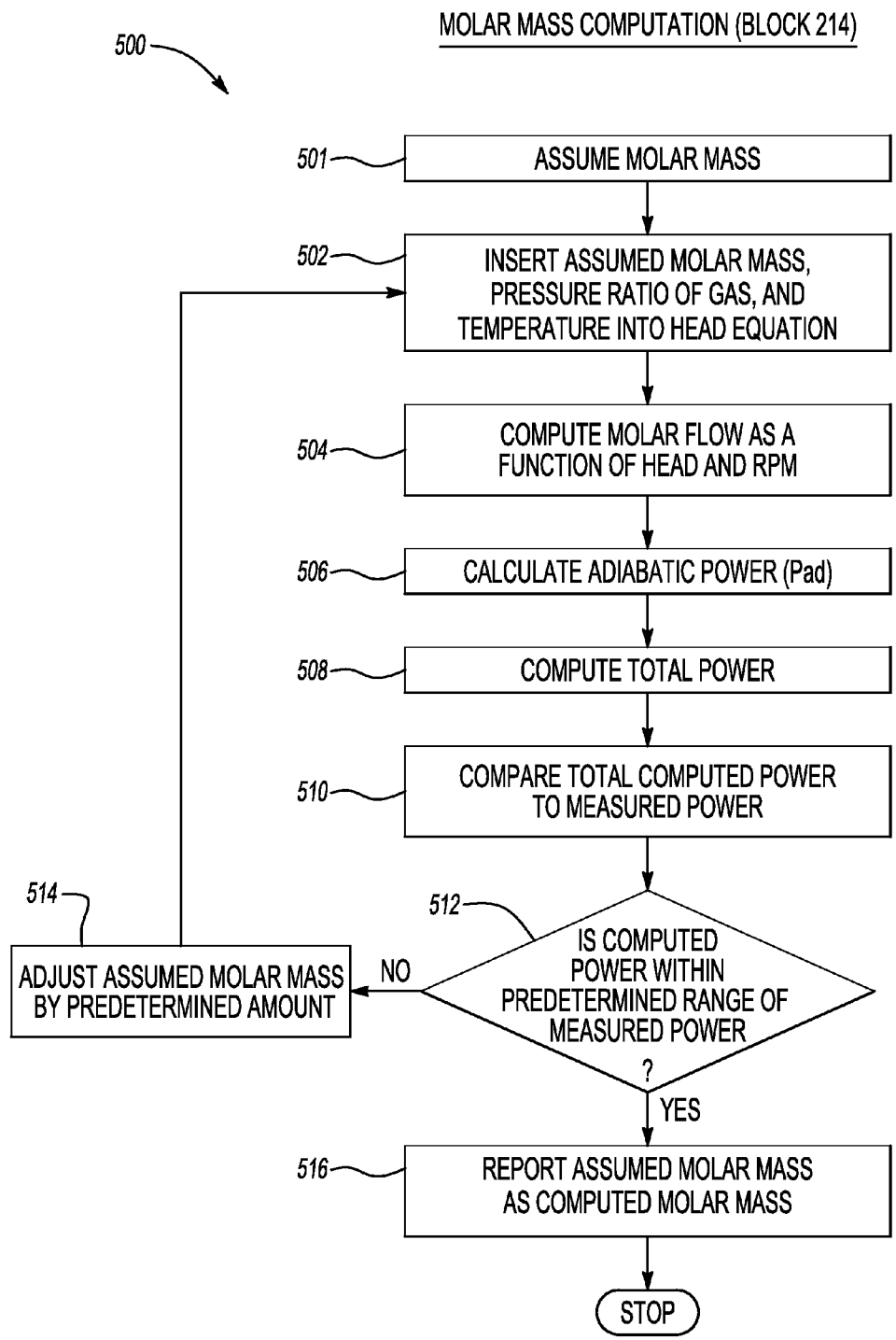
FIG. 5 depicts a flow diagram for determining the computed molar mass in accordance to one embodiment of the present invention.

FIG. 5 depicts a flow diagram 500 for the computing molar mass of block 214 in accordance to one embodiment of the present invention.

In block 501, the controller 124 assumes a molar mass of the gas mixture (i.e., hydrogen, nitrogen, and/or water). The assumed molar mass of the gas mixture may be any molar mass between 2 g/mol (e.g., molar mass of hydrogen) and 28 g/mol (e.g., molar mass of nitrogen) because it is known that the gas mixture in the recirculated fuel stream is comprised of hydrogen, nitrogen and/or water. Argonne and trace gases can be ignored. The respective molar mass values for hydrogen, nitrogen and water are 2 g/mol and 28 g/mol, and 18 g/mol, respectively.

In block 502, the controller 124 determines an assumed molar mass and uses the assumed molar mass of gas mixture (i.e., hydrogen, nitrogen or water) in the recirculated fuel stream, the $\Delta p_H$ (as calculated in block 312), and the molar mass of hydrogen to determine $\Delta p_{gas}$ (e.g., a calculated differential pressure of the gas mixture (i.e., hydrogen and/or nitrogen)) in the recirculated fuel stream. For example, $\Delta p_{gas}$ can be found with the following equation:

$$\Delta p_{gas} = \frac{\text{Assumed Molar Mass of gas mixture} * (\Delta p_H)}{\text{Molar Mass (hydrogen)}} \quad \text{(Eq. 2)}$$

A pressure ratio ($\pi gas$) of the gases in the recirculated fuel stream can be found with the following equation:

$$\pi_{gas} = \left( \frac{\Delta p_{gas}}{P_{inlet}} + 1 \right) \quad \text{(Eq. 3)}$$

where $p_{inlet}$ corresponds to the pressure at the inlet of the blower 134. $\pi_{gas}$ may correspond to the pressure ratio $\pi$ as illustrated in the y-axis of FIG. 3.

The controller 124 inserts the assumed molar mass and the pressure ratio of the gas ($\pi_{gas}$) into head equation as depicted below:

$$\text{Head} = \frac{\frac{\gamma}{\gamma-1} \cdot R^* \cdot T\left(\pi_{gas}^{\frac{\gamma-1}{\gamma}} - 1\right)}{g} \quad \text{(Eq. 4)}$$

where $\gamma$ is a constant, $R^*$ is a universal gas constant/assumed molar mass, and T is the temperature of the coolant (or recirculated fuel stream).

In block 504, the controller 124 computes the molar flow ($\dot{n}$) of the gas flow as a function of the head equation result and a particular RPM for the blower 134. At least one lookup table can be constructed for storing the various results of the head equation (Eq. 4) and blower RPMs to determine the corresponding molar flow of the gas. The molar flow generally corresponds to the number of moles of the gas in the recirculated fuel stream that is flowing through the blower 134.

In block 506, the controller 124 calculates the adiabatic power (Pad) which corresponds to the amount of power needed to push the recirculated fuel stream at the differential pressure ($\Delta p_{gas}$). Pad can be found with the following equation:

$$P_{ad} = \left(\pi_{gas}^{\frac{\gamma-1}{\gamma}} - 1\right)\left(\frac{\gamma}{\gamma-1}\right) \cdot R^* \cdot T \cdot \dot{m} \quad \text{(Eq. 5)}$$

where $\dot{m}$ corresponds to the $\dot{n}$ (number of moles) multiplied by the assumed molar mass.

In block 508, the controller 124 computes the total power. The total power can be found with:

$$P_{total} = \frac{P_{ad}}{\eta} \quad \text{(Eq. 6)}$$

where $\eta$ corresponds to a coefficient of efficiency. The efficiency is generally a characteristic of a blower design and varies with operating conditions. The efficiency is generally a link between adiabatic power (e.g., useful power) and electrical power (e.g., input electrical power to blower).

In block 510, the controller 124 compares the total power against the measured power (e.g., the measured power as determined in block 202 of FIG. 2).

In block 512, the controller 124 determines whether the total power is within a predetermined range of the measured power (e.g., 1%).

If the total power is not within the predetermined range of the measured power, the method 500 moves to block 514. In the case where the total power is not within the predetermined range of the measured power, such a condition is generally indicative the assumed molar mass is to be adjusted. For example, in the event the measured power is greater than the total power, such a condition is indicative that the recirculated fuel stream is heavier than expected (i.e., more power is needed to drive the recirculated fuel stream through the system 100) and the assumed molar mass should be changed to a larger value than that initially used. In the event the measured power is less than the total power, such a condition is indicative that the recirculated fuel stream is lighter than expected (i.e., less power is need to drive the recirculate fuel stream through the system 100) and the assumed molar mass should be changed to a smaller value than that initially used.

If the total power is within the predetermined range of the measure power, the method 500 moves to block 516. Such a condition is generally indicative that the assumed molar mass is the molar mass for the fluid of the recirculated fuel stream (i.e., the molar mass for the hydrogen, nitrogen and water mixture in the recirculated fuel stream at that particular moment).

In block 514, the controller 124 adjusts the assumed molar mass as originally defined in block 502 by compensation factor (or learning rate) to establish a second assumed molar mass. The compensation factor is generally a variable which indicates the speed in which the controller 124 is able to converge on the computed molar mass. The method 500 moves back to block 502 where the assumed molar mass initially used is replaced with a second assumed molar mass. The second assumed molar mass may be larger or smaller than the assumed molar mass used in the previous iteration based on whether the measured power is greater than the total power or whether the measured power is less than the total power. Blocks 502-512 are re-executed again with the second assumed molar mass. Blocks 502-514 may be re-executed any number of times based on whether the computed power is within the predetermined range of measured power.

In block 516, the controller 124 stores the assumed molar mass as the computed molar mass. As noted in FIG. 2, block 218, the molar mass of water is subtracted from the computed molar mass to define the dry gas molar mass.

The blocks as noted in reference to FIGS. 2 and 5 generally correspond to the manner in which the controller 124 calculates the dry gas molar mass which is used to determine the point at which it may be necessary to purge impurities from the recirculated fuel stream without the delta pressure sensor 129.

The controller 124 may calculate the dry gas molar mass for the recirculated fuel stream with the delta pressure sensor 129 with the following equation:

$$\text{Molar mass of gas} = \frac{\Delta p_{gas}}{\Delta p_H} \cdot (\text{Molar mass of hydrogen}) \quad \text{(Eq. 7)}$$

$\Delta p_H$ is a known value and is established and characterized based on the particular type of blower 134 that is implemented in the system 100. The delta pressure sensor 129 measures the $\Delta p_{Gas}$ and transmits such data to the controller 124. The molar mass of hydrogen is known to be 2 g/mol. The controller 124 may control the purge valve 127 to purge impurities in response to determining that the dry gas molar mass is above the predetermined molar mass set point. The purge valve 127 may remain in a closed state and allow the transmission of the recirculated fuel stream to the blower 134 and to the mixing chamber 114 in the event the dry gas and/or mass is detected to be below the predetermined molar mass set point.

Figure 6:
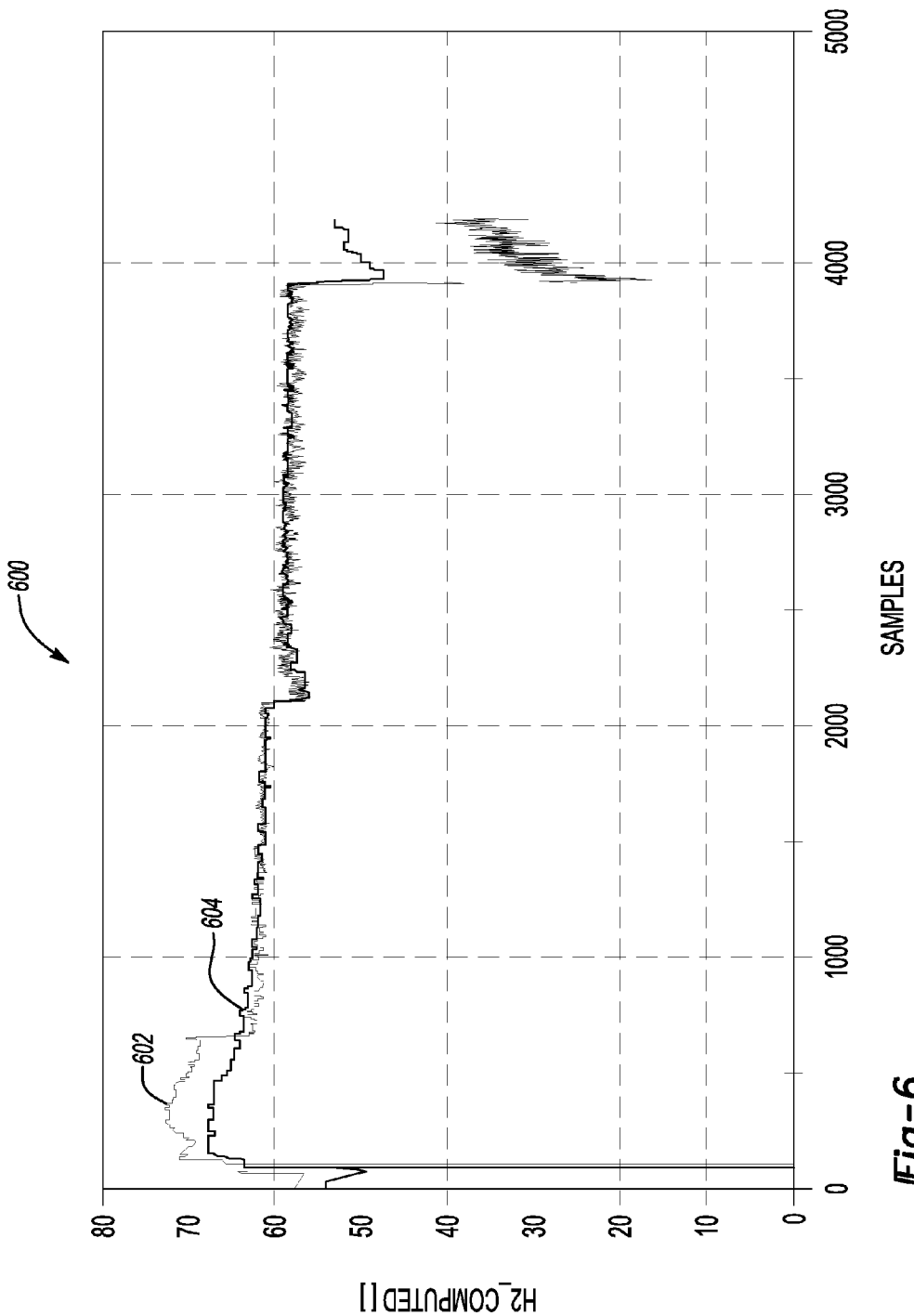
FIG. 6 depicts a plot comparing conventional hydrogen based sensor performance against the performance of the system of FIG. 1.

FIG. 6 depicts a plot 600 comparing conventional hydrogen sensor based performance against the performance of the system of FIG. 1. Waveform 602 generally corresponds to the calculated hydrogen concentration as computed by conventional hydrogen concentration sensors. Waveform 604 generally corresponds to the calculated hydrogen concentration as computed by the system 100. As shown, the computed hydrogen concentrations as depicted on the waveform 604 are comparable to the computed hydrogen concentrations on the waveform 602.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for determining a final molar mass of a recirculated stream from a fuel cell stack in a vehicle that includes a blower that delivers a recirculated fuel to the fuel cell stack, the apparatus comprising:
    a controller programmed to:
        determine an actual power amount consumed by the blower to deliver the recirculated fuel;
        provide an estimated molar mass for the recirculated fuel while the blower delivers the recirculated fuel;
        determine a first estimated power amount consumed by the blower to deliver the recirculated fuel based on the estimated molar mass; and
        compare the first estimated power amount to the actual power amount to determine a computed molar mass of the recirculated fuel.

2. The apparatus of claim 1 wherein the controller is further programmed to determine that the estimated molar mass is the computed molar mass if the first estimated power amount is within a predetermined power range of the actual power amount, the computed molar mass being indicative of the final molar mass of the recirculated fuel.

3. The apparatus of claim 1 wherein the controller is further programmed to increase the estimated molar mass to provide an increased estimated molar mass if the first estimated power amount is less than the actual power amount.

4. The apparatus of claim 3 wherein the controller is further programmed to determine a second estimated power amount consumed by the blower based on the increased estimated molar mass.

5. The apparatus of claim 4 wherein the controller is further programmed to compare the second estimated power amount to the actual power amount to determine the computed molar mass of the recirculated fuel.

6. The apparatus of claim 1 wherein the controller is further programmed to decrease the estimated molar mass to provide a decreased estimated molar mass if the first estimated power amount is greater than the actual power amount.

7. The apparatus of claim 6 wherein the controller is further programmed to determine a second estimated power amount consumed by the blower based on the decreased estimated molar mass.

8. The apparatus of claim 7 wherein the controller is further programmed to compare the second estimated power amount to the actual power amount to determine the computed molar mass of the recirculated fuel.

9. The apparatus of claim 1 wherein the controller is further programmed to determine a mass of water within the recirculated fuel and to determine a final molar mass based on the mass of water and the computed molar mass.

10. The apparatus of claim 9 wherein the controller is further programmed to subtract the mass of water from the computed molar mass to determine the final molar mass.

11. The apparatus of claim 9 wherein the final molar mass is indicative of a hydrogen concentration level within the recirculated fuel.

12. An apparatus comprising:
    a blower for delivering a recirculated fuel to a fuel cell stack and operably coupled to a controller that is programmed to (i) determine an actual power amount for the blower, (ii) provide an estimated molar mass for the recirculated fuel, (iii) determine an estimated power amount for the blower with the estimated molar mass; and (iv) compare the estimated power amount to the actual power amount to determine a computed molar mass for the recirculated fuel.

13. The apparatus of claim 12 wherein the controller is further programmed to determine that the estimated molar mass is the computed molar mass if the estimated power amount is within a predetermined power range of the actual power amount, the computed molar mass being indicative of a final molar mass of the recirculated fuel.

14. The apparatus of claim 12 wherein the controller is further programmed to determine a mass of water within the recirculated fuel and to determine a final molar mass based on the mass of water and the computed molar mass.

15. The apparatus of claim 14 wherein the controller is further programmed to subtract the mass of water from the computed molar mass to determine the final molar mass.

16. The apparatus of claim 14 wherein the final molar mass is indicative of a hydrogen concentration level within the recirculated fuel.

17. An apparatus comprising:
    a controller being operably coupled to a blower that delivers a recirculated fuel to a fuel cell stack and programmed to:
        determine an actual power amount of the blower;
        provide an estimated molar mass for the recirculated fuel;
        determine an estimated power amount for the blower with the estimated molar mass; and
        compare the estimated power amount to the actual power amount to determine a computed molar mass for the recirculated fuel.

18. The apparatus of claim 17 wherein the controller is further programmed to determine a mass of water within the recirculated fuel and to determine a final molar mass based on the mass of water and the computed molar mass.

19. The apparatus of claim 18 wherein the controller is further programmed to subtract the mass of water from the computed molar mass to determine the final molar mass.

20. The apparatus of claim 18 wherein the final molar mass is indicative of a hydrogen concentration level within the recirculated fuel.

* * * * *